UNITED STATES PATENT OFFICE.

WILLIAM B. GERE, OF SYRACUSE, NEW YORK, ASSIGNOR TO THE MERRELL-SOULE COMPANY, OF SAME PLACE.

METHOD OF PREPARING VEGETABLE-SOUP POWDERS.

SPECIFICATION forming part of Letters Patent No. 665,323, dated January 1, 1901.

Application filed December 15, 1897. Serial No. 661,972. (No specimens.)

*To all whom it may concern:*

Be it known that I, WILLIAM B. GERE, a citizen of the United States, residing at Syracuse, in the county of Onondaga and State of New York, have invented a new and useful Improvement in Methods of Preparing Vegetable-Soup Powders, of which the following is a specification.

This invention has the object to place vegetables—for instance, tomatoes, celery, celeriac, asparagus, corn, &c.—upon the market in the form of a dry powder or meal which combines readily with water, milk, or soup-stock and which is ready for use in preparing soup without requiring first to be cooked or otherwise prepared.

In preparing tomato powder according to my invention ripe tomatoes after having been washed are cooked, steamed, or stewed, preferably until they are reduced to about one-half of the original volume. The skins and seeds are then removed by straining the stewed mass in the manner usually practiced in making catchup. Starch, flour, gluten, or some other starchy or glutinous substance is then added to the strained pulp in about the proportion of from ten to fifteen per cent. of the weight of the raw tomatoes. The moist pulp mixture is then thoroughly dried, preferably by means of a well-known drying-machine containing one or more rotating hollow drying-cylinders heated by steam, upon the outer surface of which the mixture of pulp and starch is dried and from which it is removed by a scraper. The dry material is delivered from this machine in the form of thin sheets or flakes more or less broken up and is then reduced to a powder or meal, preferably in a tumbling-machine of ordinary construction, and bolted or sifted. The starch, which is added to the moist cooked pulp, absorbs moisture therefrom, whereby the starch-cells are swelled and the starch becomes thoroughly incorporated with the pulp. During the subsequent drying the heat expels the moisture from the starch-cells and causes the same to burst, leaving the starch in the most effective condition for absorbing moisture quickly and communicating it to the vegetable substance. The final product is a dry powder or meal in which the starch is thoroughly combined with the green cooked vegetable pulp and which absorbs moisture at once. In using this powder in the preparation of soup it is mixed with water, milk, or soup-stock, or a mixture of the same, in about the proportion of two and one-half ounces of the powder to one quart of liquid. The mixture is then heated, preferably to the boiling-point, when it is ready for use, forming a creamy soup of uniform consistency and excellent flavor.

In the manufacture of canned tomatoes a large amount of the liquid constituents of the tomato is wasted because too thin for use in canning. This liquid can be added to the tomatoes in cooking or stewing the same and before adding the starch and can so be utilized.

In preparing celery powder according to my invention the celery is picked apart, washed, and freed from the green leaves and roots. It is then cut into short pieces and boiled, cooked, or steamed in an open kettle for about thirty-five minutes or under steam-pressure for a correspondingly shorter time. The boiled celery is then reduced to a pulpy condition by grinding or crushing. Starch, flour, gluten, or some other starchy or glutinous material is then added to the pulp, preferably in about the proportion of from ten to fifteen per cent. of the weight of the raw celery. The mixture is then dried, reduced to a powder or meal, and bolted or sifted, as above described with reference to the preparation of tomato powder. Celeriac powder and asparagus powder can be prepared in substantially the same way.

In preparing corn powder according to my invention the green corn is cut from the cob as in preparing the corn for canning. The corn is then boiled, cooked, or steamed and reduced to a pulp by grinding or crushing. Starch or analogous material is then added, preferably in about the proportion of from four to six per cent. of the weight of the green corn removed from the cob. The mixture is then dried, ground or crushed, and bolted or sifted, as above described. The skins need not be removed before drying the mixture, because they are tough and coarse and are readily separated in the final bolting or sifting.

The vegetable substances in these powders possess a fine natural flavor and being cooked are ready for immediate consumption, and the starch mixed therewith is in a condition in which it absorbs moisture quickly, so that vegetable soups can be prepared from these powders ready for the table in a few minutes.

I claim as my invention—

The herein-described method of preparing vegetable-soup powders which consists in cooking the green vegetable substance and reducing the same to a pulp, adding starch to the pulp, drying the mixture of pulp and starch by heat, and reducing the dried mixture to a powder, substantially as set forth.

Witness my hand this 8th day of December, 1897.

WILLIAM B. GERE.

Witnesses:
M. D. CLARK,
HOWARD U. LYON.